United States Patent [19]

Maringer et al.

[11] Patent Number: 5,191,004
[45] Date of Patent: Mar. 2, 1993

[54] FLAME RETARDANT CROSSLINKABLE POLYMERIC COMPOSITIONS HAVING IMPROVED PROCESSABILITY

[75] Inventors: Melvin F. Maringer, Cincinnati; James W. Biggs, Lebanon, both of Ohio

[73] Assignee: Quantum Chemical Corporation, New York, N.Y.

[21] Appl. No.: 674,824

[22] Filed: Mar. 22, 1991

[51] Int. Cl.$^5$ .............................................. C08K 5/54
[52] U.S. Cl. .................... 524/265; 524/322; 524/399; 524/400; 524/436; 524/490; 524/491
[58] Field of Search ............. 524/265, 322, 399, 406, 524/436, 490, 491

[56] References Cited

U.S. PATENT DOCUMENTS

| | | | |
|---|---|---|---|
| 2,997,526 | 8/1961 | Kessel et al. | 174/137 |
| 2,997,527 | 8/1961 | Kessel et al. | 174/137 |
| 2,997,528 | 8/1961 | Kessel et al. | 174/137 |
| 3,832,326 | 8/1974 | North et al. | 260/42.29 |
| 3,922,442 | 11/1975 | North et al. | 428/447 |
| 4,349,605 | 9/1982 | Biggs et al. | 428/389 |
| 4,381,362 | 4/1983 | Biggs et al. | 524/305 |
| 4,477,523 | 10/1984 | Biggs et al. | 428/389 |
| 4,514,539 | 4/1985 | Hattrich et al. | 524/436 |
| 4,845,146 | 7/1989 | Inoue et al. | 524/436 |
| 5,091,007 | 2/1992 | Hansen | 106/30 |

FOREIGN PATENT DOCUMENTS

| | | | |
|---|---|---|---|
| 61-213214 | 9/1986 | Japan | 524/436 |
| 61-291637 | 12/1986 | Japan | 524/436 |
| 62-030138A | 2/1987 | Japan | 524/436 |

*Primary Examiner*—Paul R. Michl
*Assistant Examiner*—John J. Guarriello
*Attorney, Agent, or Firm*—Kenneth D. Tremain; Gerald A. Baracka

[57] ABSTRACT

The invention relates to improved flame retardant crosslinkable compositions useful as insulation coatings for wire and cable based on ethylene-vinyl ester and ethylene-alkyl acrylate copolymers. The compositions contain a hydrated inorganic filler, an alkoxysilane, an antioxidant and a hydrocarbon processing oil. Organic peroxides are preferably employed to facilitate crosslinking. A method for providing the improved flame retardant crosslinkable compositions and electrical conductors coated therewith are also provided.

24 Claims, No Drawings

FLAME RETARDANT CROSSLINKABLE POLYMERIC COMPOSITIONS HAVING IMPROVED PROCESSABILITY

BACKGROUND OF THE INVENTION

1. Field of the Invention

This invention relates to polymeric compositions which can be crosslinked to produce heat resistant and flame resistant products useful in the production of coated wire and cable products as well as film sheet and molded products. More particularly, the invention relates to flame retardant crosslinkable ethylene-vinyl ester and ethylene-alkyl acrylate copolymer compositions which exhibit improved extrusion processability and, after crosslinking, improved resistance to degradation by heat aging.

2. Description of the Prior Art

Fire resistant polymer compositions are widely utilized for wire and cable insulation. In electrical environments both insulating and fire resistant properties are considered to be necessary. For flame resistance, extrudable compositions available to the wire and cable art were at one time required to contain sizeable quantities of halogenated polymers, such as chlorinated polyethylene, polyvinyl chloride, chlorinated polybutadiene, chlorinated paraffin, etc., and antimony trioxide. Alternatively, a coating of chlorosulfonated polyethylene paint was applied to a nonflame retardant insulating compound which required an additional manufacturing operation.

In certain applications electrical failures occurred due to migration of the organic insulating component. The problem was solved through the addition of hydrated alumina to compositions whose organic binder consisted of butyl rubber, epoxy resins or polyester resins. Such compositions are disclosed in Kessel et al U.S. Pat. Nos. 2,997,526, 2,997,527, and 2,997,528. The compositions, however, did not have an acceptable balance of processability and extrudability characteristics, physical and electrical properties, heat resistance and flame resistance. Furthermore, these compositions exhibited unacceptable tensile strength, elongation and percent elongation after aging.

Fire retarding polymeric compositions exhibiting improved moisture and heat resistance comprised of a crosslinkable polymer, such as ethylene-vinyl acetate copolymer, one or more silanes and one or more hydrated inorganic fillers have found wide acceptance in the wire and cable industry. Such compositions are disclosed in U.S. Pat. Nos. 3,832,326 and 3,922,442 to North et al and U.S. Pat. Nos. 4,349,605 and 4,381,362 to Biggs et al. Additives such as pigments, stabilizers, lubricants, and antioxidants are also typically included with the crosslinkable polymer, silane and hydrated filler. Such formulated compositions exhibit a unique balance of processability, physical and electrical properties, and a high degree of flame and fire retardance. Moreover, these highly desirable results are achieved (a) without the use of halogenated polymers, such as polyvinyl chloride and chlorosulfonated polyethylene, thereby eliminating potential for generating dangerous hydrogen chloride fumes; (b) without the use of carbon black thereby making it possible to formulate colored insulations; (c) without the application of any flame retardant coatings thereby eliminating the need for an additional step in manufacturing operations after the insulating compound is extruded onto the conductor; and (d) without the use of antimony trioxide thereby eliminating the need to use a substantial quantity of an expensive compounding ingredient.

The compositions of North et. al., and Biggs et. al., find particular utility where white and colored insulation compositions are extruded over metal conductors, e.g., copper or aluminum wire, to provide a single layer insulating and jacketing composition which meets the automotive primary SAE J1128 standards and UL 125° C. appliance wire SIS standards. These are widely used for switchboard wire, appliance wire and automotive wire where a unique combination of superior electrical properties combined with resistance to the degradative effects of heat and flame are essential and where low smoke density and non-corrosive fumes are desirable.

The use of petroleum oils in the compounding of rubbers is widely practiced. Many elastomers do not develop crystallinity upon stretching and exhibit relatively low gum tensile strengths so that reinforcement by carbon black and other fillers is necessary to develop the strength demanded of rubber products. Petroleum oils function to provide the capability for high loading of reinforcing filler to obtain the desired physical properties while improving processability for mixing and fabrication of a rubber composition. Processing improvements can include reducing the viscosity of the formulation, facilitating dispersion of fillers and pigments, reducing mixing temperature and power requirements and providing the necessary flow characteristics to fabricate and cure the composition in a final product form. Oils can also reduce shrinkage and modify the performance properties of the resulting vulcanizate. While the amount of the petroleum processing oils can vary, depending on the type of oil, the elastomer being formulated and the filler level, they are typically utilized in amounts from about 10 parts up to as high as 150 parts per 100 parts elastomer. Most commonly, the oils are utilized from about 25 to 50 parts per hundred per elastomer. Petroleum oils are typically not utilized with polyolefin type resins since they have very limited compatibility with polyolefin polymers, provide little plasticization and have a tendency to exude to the polymer surface with aging. In contrast to many elastomers, many polyolefin polymer do develop crystallinity with stretching and the addition of a petroleum oil can detract from reinforcement by a filler. At the concentration levels employed with elastomers, petroleum oils can detract from processability and compound preparation. The oils can cause slippage to prevent development of adequate shear during compound mixing. Also, in the fabrication of the compound, petroleum oils can function as an external lubricant and prevent the homogeneous processing of the compound to a final product form and cause unsteady processing conditions.

We have now unexpectedly discovered that by incorporating low levels of certain hydrocarbon processing oils into flame retardant crosslinkable polyolefin compositions improved processability and physical properties can be realized. It has also quite unexpectedly been discovered that the addition of small amounts of these petroleum oils to ethylene copolymers significantly improves the resistance to scorch and substantially lowers processing power requirements and pressure development.

It is an object of this invention to provide improved crosslinkable flame retardant polymeric compositions based on ethylene-vinyl ester copolymers and ethylene-alkyl acrylate copolymers which exhibit superior processing characteristics and have improved resistance to scorch. It is a further object to provide crosslinked compositions which exhibit improved resistance to oxidative degradation.

SUMMARY OF THE INVENTION

These and other objectives are realized in accordance with the present invention by the incorporation of low levels of hydrocarbon processing oils into flame retardant crosslinking polymeric formulations. Utilization of a hydrocarbon processing oil in the formulation improves processability and, quite unexpectedly, extends scorch time without adversely affecting the cure rate and the physical properties of the crosslinked product. The addition of scorch retarders typically has a detrimental effect on the cure rate, degree of cure, cured physical properties or a combination of these parameters. Additionally, the resulting crosslinked compositions have improved resistance to degradation upon heat aging.

The crosslinkable polymeric compositions of the present invention are comprised of (1) a polymer selected from the group consisting of copolymers of ethylene and vinyl esters of $C_{2-6}$ aliphatic carboxylic acids, copolymers of ethylene and $C_{1-6}$ alkyl acrylates, copolymers of ethylene and $C_{1-6}$ alkyl methacrylates, or mixtures thereof; (2) 80 to 400 phr hydrated inorganic filler; (3) 0.5 to 5 phr of an alkoxysilane; (4) 0.5 to 8 phr antioxidant; and (5) 0.25 to 6 phr of a hydrocarbon processing oil. In another embodiment of the invention from 0.25 to 5 phr of a second processing additive selected from the group consisting of a fatty acid, a calcium soap of a fatty acid, an aluminum soap of fatty acid, a fatty acid amide, a mixture of fatty acids and fatty acid amides, a natural or synthetic wax or a low molecular weight polyethylene will also be present. In a particularly useful embodiment of the invention the formulation also contains from 1 to 8 phr of a chemical crosslinking agent, preferably an organic peroxide. The hydrocarbon processing oil can be a naphthenic or paraffinic oil and will generally have a viscosity(100° F.) from 100 to 2500 SUS.

DETAILED DESCRIPTION OF THE INVENTION

The present invention relates to improved polymeric compositions comprising copolymers of ethylene and a vinyl ester of an aliphatic carboxylic acid, an alkyl acrylate or an alkyl methacrylate, a silane, and a hydrated inorganic filler. In addition to the foregoing, the compositions also contain an antioxidant or combination of antioxidants and a hydrocarbon processing oil. Optionally, other processing agents, such as a fatty acid and/or fatty acid derivative, and crosslinking agents, such as organic peroxides, can also be present in the formulation. By incorporating low levels of hydrocarbon processing oils into these formulations, it is possible to increase scorch resistance, decrease power requirements and improve processing stability of the uncured composition and, after crosslinking, to obtain products which exhibit increased long term heat stability and a better balance of tensile strength and elasticity properties. The compositions of this invention are crosslinkable and find particular utility for wire and cable insulation.

The terms "crosslink" and "cure" and their derivative forms are employed synonymously herein and are ascribed their normal art recognized meaning, i.e., they denote the formation of primary valence bonds between polymer molecules. Scorching is used in the conventional sense to denote premature crosslinking of the compositions during processing.

Controlled crosslinking can be accomplished using any of the known procedures such as chemical means including peroxide crosslinking or silane crosslinking; by radiation using cobalt-60, accelerators, $\beta$-rays, $\gamma$-rays, electrons, X-rays, etc.; or thermally. The basic procedures for crosslinking polymers are well known to the art. All parts and percentages referred to in the specification and claims which follow are on a weight basis unless otherwise indicated.

THE ETHYLENE COPOLYMER

The polymeric component employed for the present compositions is a copolymer of ethylene and a comonomer which may be a vinyl ester or an alkyl acrylate, the latter being used in the generic sense to encompass esters of both acrylic and methacrylic acid. The vinyl ester may be a vinyl ester of a $C_2$–$C_6$ aliphatic carboxylic acid, such as vinyl acetate, vinyl propionate, vinyl butyrate, vinyl pentanoate or vinyl hexanoate. The acrylates may be any of the $C_1$–$C_6$ alkyl esters of acrylic or methacrylic acid including, for example, methyl, ethyl, propyl, butyl, pentyl or hexyl acrylate or methacrylate.

A preferred copolymer comprising the polymeric component of this invention is an ethylene-vinyl acetate copolymer (EVA) containing about 9% to about 45% and, more preferably, 9% to about 30%, vinyl acetate, with the balance being ethylene. Terpolymers of ethylene, vinyl acetate and other known olefinic monomers polymerizable therewith can also be employed. Generally, if a third monomer is present it will not constitute more than about 15% of the polymer composition.

Another preferred copolymer is derived from the copolymerization of ethylene and butyl acrylate. Useful ethylene-butyl acrylate copolymers (EBA) will contain about 10% to about 45% and, more preferably, 15% to 30% butyl acrylate—the balance being ethylene. n-Butyl acrylate is a preferred comonomer.

Blends of EVA and EBA can also be advantageously utilized. The EVA will generally constitute the major component of the blend but this is not necessary. The EVA will most typically constitute greater than 75% of the blend.

It is also possible to include minor proportions of other crosslinkable polymers or copolymers in the composition of this invention; however, ethylene copolymers as described above should comprise at least 50% of the total polymers present. Representative of such minor polymeric components which can be used in such embodiments include polyethylene, polypropylene, ethylene-propylene copolymers and terpolymers, and the like. Low density polyethylene and linear low density polyethylene having melt indexes from 0.5 to 5 provide particularly desirable blends when present in amounts of 30% or less, based on the total polymer.

The ethylene copolymers and blends thereof will typically have melt indexes from 0.1 to 7 g/10 min. The EVA copolymers will usually have a melt index from about 0.5 to 5 whereas the melt index of EBA copolymers generally ranges from 0.1 to 3.

THE HYDRATED INORGANIC FILLER

To obtain flame retardant and other properties necessary for wire and cable applications, it is necessary that a hydrated inorganic filler be used in formulating the polymeric compositions. The fillers used in the present invention are hydrated inorganic fillers, e.g., hydrated aluminum oxides ($Al_2O_3 \cdot 3H_2O$ or $Al(OH)_3$), hydrated magnesia, hydrated calcium silicate, hydrated magnesium carbonates, or the like. Of these compounds, hydrated alumina is most advantageously employed. The water of hydration present in the inorganic filler must be capable of being released during the application of heat sufficient to cause combustion or ignition of the ethylene copolymers. While minor amounts of other types of fillers may be tolerated, large amounts of these secondary fillers cannot be utilized.

Since the water of hydration chemically bound to the inorganic filler is released endothermically, the hydrated inorganic filler imparts flame retardance. In fact, they increase flame retardance to a far greater degree than other fillers such as carbon black, clays, and titanium dioxide, which were previously used by the art to impart flame retardance to insulation. What is even more surprising is that flame retardance is combined with excellent electrical insulation properties at the high filler loadings used. The filler size should be in accordance with those sizes used by the prior art.

THE SILANE COMPONENT

One or more alkoxy silanes are necessarily included in the improved compositions of the present invention. Any alkoxy silane can be used which does not adversely affect the desired balance of properties and which facilitates binding the polymer and inorganic filler with the proviso that the silane can not be combustible or degrade during polymer processing or interfere with polymer crosslinking.

Alkoxysilanes used in forming the insulating compositions include lower alkyl-, alkenyl-, alkynyl-, and aryl-alkoxysilanes containing from 1 to 3 alkoxy substituents having from 1 to 6 and, more preferably, 1 to 3 carbon atoms. Alkoxysilanes having 2 or 3 $C_{1-3}$ alkoxy substituents, e.g. methoxy, ethoxy, propoxy or combinations thereof, are particularly advantageous. Illustrative silanes include methyltriethoxysilane, methyltris(2-methoxyethoxy)silane, dimethyldiethoxysilane, ethyltrimethoxysilane, vinyltris(2-methoxyethoxy)silane, phenyltris(2-methoxyethoxy)silane, vinyltrimethoxysilane and vinyltriethoxysilane, and gamma-methacryloxypropyltrimethoxysilane.

It is preferred to use vinyl alkoxysilanes for best results. Of the vinyl alkoxysilanes, gamma-methacryloxypropyltrimethoxysilane of the formula

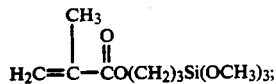

vinyltris(2-methoxyethoxy)silane of the formula

vinyltrimethoxysilane of the formula

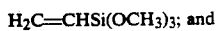 and vinyltriethoxysilane of the formula

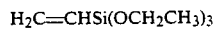

are especially useful. Vinyltrimethoxysilane is particularly advantageous for use in the improved compositions of the invention.

THE ANTIOXIDANT

Conventional antioxidants, such as those known to this art, can be utilized for this purpose. For example, polymerized 1,2-dihydro-2,2,4-trimethyl quinoline and tris(3,5-di-t-butyl-4-hydroxy benzyl) isocyanurate can be employed. Various thio compounds and hindered phenols, such as those disclosed in U.S. Pat. No. 4,381,362 also provide effective stabilization. Combinations of these latter antioxidants have been demonstrated to be particularly effective and make it possible for the resulting compositions to pass the Canadian Standards Association (CSA) varnish test. Combinations of distearyl-3,3'-thiodipropionate (DSTDP) and tetrakis(methylene(3,5-di-t-butyl-4-hydroxyhydrocinnamate)) methane are most notable in this regard. The CSA test is described in detail in the above-noted reference.

In addition to the foregoing, various other thio compounds, such as dilauryl-3,3'-thiodipropionate, dimyristylthiodipropionate, ditridecylthiodipropionate, bis alkyl sulfides, and hindered phenols, such as 2,6-di-t-butyl-p-cresol, octadecyl 3,5-di-t-butyl-4-hydroxyhydrocinnamate, 2,2'-methylene bis(6-t-butyl-4-methylphenol), 4,4'-butylidene bis(6t-butyl-3-methyl phenol), 1,3,5-trimethyl-2,4,6-tris(3,5-di-t-butyl-4-hydroxybenzyl) benzene, and 2,2'-methylene bis (4-methyl-6-t-butylphenol) can be used.

Also, other antioxidants and stabilizers known to the art for the stabilization of polyolefin resins can be utilized. These can be employed alone or together with the above noted antioxidants or antioxidant systems. Such stabilizers include ultraviolet light stabilizers of the hindered amine, benzophenone or nickel type. Antioxidants and stabilizers utilized should not have a detrimental effect on polymer crosslinking.

In one highly useful embodiment of this invention, a bis alkyl sulfide is employed in combination with tetrakis (methylene (3,5-di-t-butyl-4-hydroxyhydrocinnamate)) methane. By using wire and cable formulations containing this combination of antioxidants, particularly when employed at a ratio from 1.5:1 to 3:1 (sulfide:-phenol), it is possible to significantly reduce and in some cases completely eliminate undesirable discoloration of copper conductors. The use of certain widely used thio antioxidants, such as DSTDP, in insulation formulations can produce undesirable discoloration of the surface of the copper conductor under certain processing conditions. The presence of even slight discoloration or tarnish on the surface of the copper wire can interfere with the ability to produce sound connections by soldering. A fresh clean wire surface after stripping is particularly desirable in automated soldering operations.

Useful bis alkyl sulfides are commercially available. One such product is commercially available under the designation ANOXSYN TM 442.

THE PROCESSING OIL

The use of various additives to facilitate processing of crosslinkable flame retardant polymeric compositions of the type encompassed by this invention is known. Even though the role which various process additives play is not clearly understood and subject to considerable speculation and discussion, i.e. whether they are internal or external lubricants, whether they coat or bind the filler, etc., they are nevertheless considered to be essential for efficient mixing and to achieve uniform, trouble-free extrusion of the formulated composition onto the wire and cable.

One or more processing aids, i.e., lubricants, is required in the formulation of the crosslinkable compositions disclosed in the above-referenced North et al and Biggs et al patents. These lubricants, in addition to facilitating processing, are considered to be important to improve the stripping properties of the wire or cable insulation and include fatty acid soaps, such as calcium stearate and aluminum stearate, silicone oils, long-chain aliphatic amides, natural and synthetic waxes and low molecular weight polyethylene. A particularly useful lubricant combination disclosed in U.S. Pat. No. 4,349,605 for use in radiation curable polymeric compositions is a mixture of lauric acid and ethylene-bis-stearamide.

Generally speaking, extrusion coating of wire and cable is not limited by the equipment used but rather by the processability of the insulation compositions. If compositions having improved processability were available, the output of most coating lines could be significantly increased. It is therefore a continuing objective within the wire and cable industry to improve processability of insulation compositions so that line speeds can be increased. This, of course, must be accomplished without significantly altering the physical properties of the insulation material.

Heretofore it has not been possible to improve the processability of highly filled crosslinkable flame retardant compositions to effect significant increases in extrusion rates without compromising physical properties or otherwise adversely affecting the quality of the insulation coating. One cannot simply increase the amount of the known lubricant additives, such as the lauric acid/EBS lubricant package. While this may facilitate blending, it creates other problems. For example, it can lead to exudation of one of the lubricants or other additive, contribute to "die drool", and cause surging. "Die drool" is an undesirable build up of extrudate on the lips of the die. During operation, these build ups periodically release and are transferred to the surface of the insulated wire forming lumps or rings on the insulated wire. In assembling the insulated wire into wiring harnesses, the section of wire containing these imperfections must be cut out and discarded. Surging results in the application of an insulation coating of uneven thickness. Too thick an application of insulation results in increased manufacturing costs whereas an inadequate thickness of the insulation layer can result in burn through and shorting. An excessive amount of lubricant can also significantly decrease the physical properties of the crosslinked composition and make it difficult or impossible to obtain the mechanical shear required to adequately mix the composition in an intensive mixer.

It has now been discovered that by utilizing specified low levels of certain hydrocarbon processing oils, by themselves or in combination with other known processing aids, that processability of the crosslinkable formulations can be significantly improved without the adverse effects heretofore obtained. Additionally, the compositions containing chemical crosslinking agents can be compounded in high shear mixing equipment with improved control of temperature and improved resistance to scorch formation. The compounded product processes in extrusion equipment with lower poor requirement, less pressure build up and increased resistance to scorch. Also, an increased heat stability of the crosslinked product is observed. Whereas, some improvement in processability might be predicted by the use of these hydrocarbon processing agents, significant improvement of the scorch time without inhibiting total cure together with a significant improvement of the heat stability of the composition after crosslinking is totally unexpected.

Useful hydrocarbon processing oils for this invention are naphthenic and paraffinic oils. Such oils are obtained from the refining and processing of selected petroleum crude oils and are widely available from commercial sources, such as, Sun Refining and Marketing Company, Exxon Chemical Americas and Witco Corporation-Golden Bear Division. Hydrocarbon oils employed for these formulations will generally have saturates contents from 50 to 90 percent and the total aromatics content will not exceed 50 percent. Total aromatics contents will most commonly range from 10 to 45 percent. Viscosities of these oils will range from 100 to 2500 SUS at 100° F. and, more preferably, from 200 to 1200 SUS at 100° F.

To obtain the necessary balance of processability and physical properties required for most wire and cable applications, it is generally advantageous to include one or more additional processing aids with the hydrocarbon processing oil. While any known processing agent can be employed for this purpose, superior results have been obtained when these materials are fatty acids or fatty acid derivatives such as metal soaps, esters, ester-soaps, amides, and the like. The term fatty acid as employed herein, refers to aliphatic carboxylic acids having from 8 to 22 carbon atoms. While these acids are usually derived from natural sources, they can also be synthetically produced. The fatty acids can be branched or straight-chain, saturated or unsaturated and they may consist of a single acid, or as is more commonly the case, a mixture of acids within the specified carbon content range. Illustrative fatty acids include caproic acid, caprylic acid, capric acid, lauric acid, myristic acid, myristoleic acid, palmitic acid, palmitoleic acid, stearic acid, isostearic acid, oleic acid, linoleic acid, eleostearic acid, behenic acid, erucic acid and the like. Useful fatty acid mixtures are obtained from triglycerides present in natural fats and oils including coconut oil, cottonseed oil, linseed oil, palm oil, soy oil, tall oil, safflower oil, corn oil, rapeseed oil, tallow or the like.

While the fatty acids or mixtures may be utilized as such they are more commonly employed in their derivative forms. Alternatively, a mixture of fatty acid and fatty acid derivative can be used. Especially useful fatty acid derivatives which can be used, alone or in admixture with the same or different fatty acid, are the calcium or aluminum soaps and amides, including bis-amides formed by the reaction of two moles of a fatty acid or fatty acid ester with one mole of an aliphatic diamine, e.g., ethylene diamine. It is necessary to avoid soaps which interfere with the crosslinking reaction (a free radical mechanism), such as zinc soaps, and which react with organic peroxides. Acceptable soaps are the alkaline earth metal fatty acid soaps and calcium stearate has been found to be particularly advantageous. Erucamide and ethylene-bis-stearamide are particularly useful fatty acid amides. In one highly useful embodiment of the invention, the fatty component consists of a mixture of a fatty acid with a fatty acid amide present in a ratio from 2:1 to 1:10. Combinations of lauric acid and ethylene-bis-stearamide are most notable in this regard. If a fatty component is employed with the hydrocarbon oil to comprise a processing additive package, the ratio of fatty acid (or derivative) to hydrocarbon oil will range from 3:1 to 1:8 and, more preferably, from 2:1 to 1:5.

Also, since it is often advantageous to utilize a mixture of lubricants with different melting points and chemical structures, natural or synthetic hydrocarbon waxes or low molecular weight polyethylenes can also be employed with the hydrocarbon oil or processing additive package to obtain the desired balance of processing properties.

COMBINING THE COMPONENTS

The compositions of the invention may be formed in a number of ways provided that the filler and silane are intimately contacted. The silane may be added directly to the filler and dispersed in the polymer using a high shear internal mixer such as a Banbury, Farrel Continuous Mixer, Bolling Mixtrumat TM or Werner & Pfleiderer mixer and the antioxidant, lubricant and processing oil then added. Alternatively, the silane is first added to the polymer followed by addition thereto of the filler, antioxidant, lubricant, processing oil and any other additives. All compounding ingredients can be charged to the mixer at the initiation of mixing as long as the silane and filler have intimate contact during the mixing process.

The hydrated inorganic filler can be varied within wide limits. The filler can range from 80 to 400 parts per 100 parts of the polymer resin (phr). Most commonly, from 80 to 200 phr of filler is employed. The alkoxysilane will range from about 0.5 to 5 phr and, more preferably, from 0.75 to 4 phr. Too small an amount may be insufficient to provide adequate surface treatment of the filler while too large a quantity can have an adverse effect on physical properties, primarily percent elongation, after crosslinking.

The antioxidant or antioxidant package will be selected to meet the service requirements for the particular polymer being used but will generally be present from 0.5 to 8 phr and, more preferably, from 1 to 6 phr. Higher levels of antioxidant are required for high temperature wire and cable applications. If two or more antioxidants are employed they may be added to the formulation separately or combined prior to incorporation.

From 0.25 to 6 phr of the hydrocarbon processing oil can be utilized. Most frequently, the naphthenic or paraffinic oil will be employed in the formulation at 0.5 to 4 phr. For reasons not completely understood, use of the processing oil with 0.25 to 5 phr fatty acid or fatty acid derivative or mixture thereof significantly improves properties in both the uncrosslinked and crosslinked composition. The uncrosslinked compositions exhibit improved processability; particularly, the time before the onset of scorch under the processing conditions is significantly increased. This provides the processor with greater flexibility in the selection of operating conditions and, in some cases, makes it possible to increase the line speed of the coating operation. The broadened operating window also makes it possible to accommodate unanticipated changes in processing conditions which frequently occur and which can result in the production of unacceptable product or catastrophic failure, i.e. blowing the extruder head or freeze-up of the extruder. Upon crosslinking, the compositions develop acceptable physical properties and, quite unexpectedly, the essential physical properties are retained for a longer period upon heat aging. In a particularly useful embodiment of the invention, 1 to 6 phr of a combination of processing additives comprised of the hydrocarbon processing oil, a fatty acid and a fatty acid amide are employed.

In addition to the previously mentioned mixers, other processing devices known to the art capable of intimately mixing the essential components may be used. The compositions may also contain other additives, such as carbon black, pigments and the like, provided they do not interfere with crosslinking or detract from the physical properties of the composition. The total amount of any additional ingredients will generally not exceed about 15 phr. In one highly useful embodiment of the invention, from 1 to 8 phr of a chemical crosslinking agent is included in the formulation.

The ethylene-vinyl ester and ethylene-alkyl acrylate copolymers formulated as hereinabove described can be crosslinked using conventional procedures known to the art, such as by high-energy irradiation or by the use of chemical crosslinking agents. Fully crosslinked, these polymers exhibit thermoset behavior and provide a superior and unexpected balance of:

(1) low temperature brittleness, i.e., the compositions do not readily crack during low temperature movement (ASTM D-746);

(2) heat resistance after aging, i.e., excellent elongation after extended service at 90° C., 125° C. or even 135° C.;

(3) arcing and tracking resistance as high as 5 KV;

(4) resistance to ignition by flame and flame retardance;

(5) moisture resistance i.e., low mechanical absorption of water providing retention of dielectric properties in wet and humid environments;

(6) dielectric properties;

(7) oil resistance; and (8) resistance to industrial chemicals

It has been demonstrated that for low voltage environments, i.e., less than 5000 volts and more commonly less than 600 volts, the compositions of this invention are particularly useful for service as uniinsulation. Uniinsulation is an art accepted term denoting insulation where one layer is extruded around a conductor. This single layer serves as the electrical insulation and the jacketing to provide physical and flame protection. The present compositions are especially well suited for service as uniinsulation where a superior balance of properties is required. It has been observed that the compositions can contain a high loading of filler and still provide high flexibility and a high degree of crosslinking. Moreover, the ability to achieve high filler loading, flexibility and crosslinking with improved processability and heat aging is a significant advance in the wire and cable insulation art.

Any means known for crosslinking ethylene copolymers can be utilized with the compositions of this invention. While it is possible to thermally crosslink the compositions, it is more common to utilize a source of high energy ionizing radiation or a chemical agent for this purpose.

High energy radiation sources which can be used to crosslink these compositions include cobalt-60, β-rays, γ-rays, x-rays, electron beams, accelerators or the like. Electron beam radiation is a particularly advantageous method of radiation crosslinking. The art of radiation crosslinking is so highly developed that little need be said with respect to such procedures. As higher total doses of radiation are used, the degree of crosslinking generally increases. For effective crosslinking a total radiation dose of about 5 to 25 megarads is generally required.

Chemical crosslinking can be accomplished by the use of conventional agents known to generate free radicals upon decomposition. Organic peroxides are most commonly employed for this purpose. In view of the ability to rapidly achieve high levels of cure using chemical crosslinking agents and the uniformity of the results obtainable therewith, this method is widely practiced to cure wire and cable insulation. Chemical crosslinking is accomplished by incorporating the organic peroxide or other crosslinking agent into the composition at a temperature below the decomposition temperature of the crosslinking agent. The chemical agent is later activated to cure the composition, i.e., crosslink the ethylene copolymer into a three-dimensional network.

Crosslinking is carried out in accordance with procedures well known to the art and variations in the general conditions necessary to effect same will be apparent to skilled artisans. The invention is not limited to the use of organic peroxides for chemical crosslinking—other art recognized materials which decompose to provide free radicals can also be used. Obviously such crosslinking agents should not decompose during compounding. Known crosslinking coagents, such as triallylcyanurate and the like, may also be included to increase the effectiveness of the cure.

Tertiary organic peroxides are especially useful chemical crosslinking agents. Dicumyl peroxide and alpha, alpha'-bis(t-butylperoxy)diisopropylbenzene are particularly advantageous. As with most other chemical crosslinking agents, the tertiary organic peroxides are activated by heating to above their activation temperature whereupon decomposition occurs. Any of the known procedures to accomplish decomposition, such as the application of high pressure steam or the like, can be used.

The crosslinking is generally carried out at superatmospheric pressures, on the order of 100 psi to 400 psi, although higher or lower pressures may be used. Pressure is employed to avoid developing porous crosslinked compositions which are unsuitable for electrical insulation.

In general, as the amount of crosslinking agent is increased the degree of crosslinking increases. Usually, no more than about 8 phr organic peroxide is necessary and, most preferably, 1.5 to 5 phr peroxide is used. Other crosslinking agents may require some variation in the amount used. The higher the degree of crosslinking, the greater is the toughness and the greater is the resistance to moisture and chemical reagents of the polymeric composition. When too low a degree of crosslinking is achieved, the physical properties of the product are inadequate and subject to pronounced deterioration upon aging. Insufficient crosslinking results principally in a deficiency in retention of stiffness at elevated temperature since the material will have too low a softening point. The exact degree of crosslinking is therefore varied to take the above factors and their effect on the final product into account. For wire and cable insulation the level of crosslinking is generally greater than 80% although lower values are possible. Crosslinking is determined by extraction of the crosslinked polymer to measure the amount of insoluble gel. Crosslinking levels of 85% to 95% are most typical.

EXAMPLES

Various aspects of the invention are described in greater detail in the examples which follow. These examples are for illustration purposes only and are not intended to limit the invention. Numerous variations are possible without deviating from the spirit and scope of the invention and will be apparent to those skilled in the art.

To prepare the formulations used in the examples the ingredients were added to a Banbury mixer and mixed at a temperature below the decomposition temperature of the peroxide, usually about 110°-125° C., until a homogeneous dispersion was obtained. Generally, uniform dispersion of the compounding ingredients in the copolymer was achieved by mixing for about 3-5 minutes. The mixture was then extruded to obtain the product in pellet form. A conventional extruder fitted with an extruder die and an underwater pelletizer was employed for this operation. The pelletized product was recovered and utilized for subsequent evaluations.

Physical properties (tensile and elongation) of the products were determined in accordance with ASTM D-638 using specimens that were cured for 6 minutes in a compression mold maintained at 250 psi and 200°-205° C. Under these conditions, cures of 80% or greater with tensile strengths of at least 1800 psi, and more generally greater than 2000 psi, and elongations greater than 200% are typically achieved. The cure level was determined by measuring the percent gel in accordance with ASTM D-2765, Method C.

Resistance to thermal aging was determined using accelerated tests wherein the test specimens are heated in a forced-air circulating oven for extended periods up to as long as 60 days. As the samples deteriorate due to the heat aging process, they become more brittle and the percent elongation decreases. Deterioration is therefore determined by observing the decrease in elongation with time. Products are considered to be marginal when upon heat aging the elongation drops below 175% or the % retention of the unaged elongation falls below 75%. For compositions designed for 125° C. continuous service, accelerated heat aging tests were conducted at 158° C. Accelerated heat aging tests were carried out at 165° C. for compositions formulated for 135° C. continuous service and at 180° C. for compositions formulated for 150° C. continuous service.

For meaningful comparison of physical properties of different products, the degree of cure of the products being compared should be 80% or greater and, preferably, within ±5%. Electrical properties (dielectric constant and dissipation factor) of cured compositions were determined in accordance with ASTM D-150

Extrusion evaluations were performed using a 1 inch diameter Brabender extruder having three electrically heated zones and an air-cooled barrel. The extruder had a 20:1 length to screw diameter ratio. A polyethylene-type screw with 20 flites and a 4:1 compression ratio was employed and a pressure gauge was located at the end of the screw at the location where a breaker plate is normally employed. The extruder was equipped to measure the torque required to process the material.

A Brabender wire insulating die assembled for the insulation of 18 AWG wire was employed with a wire inserted through and fixed in the die. While the wire was not pulled through the die for these laboratory extrusions, a strand was produced with the same restrictions at the die orifice as encountered during wire insulation using production units.

The extruder barrel zones 1, 2, and 3 were set at 210° F., 220° F., and 230° F., respectively, and the die temperature was set at 230° F. Screw speed was maintained at 100 rpm. These conditions effectively measure the relative processability of different insulation compositions and the tendency of the materials to increase temperature at the compression area (zone 2) of the screw. Temperatures, head pressure and torque were recorded versus time to measure the relative ability of materials to be processed at high extrusion speed without developing scorch, i.e., prematurely crosslinking. When the temperature in zone 2 increased to 295°–300° F. the crosslinked material was quickly purged with uncompounded copolymer resin to avoid freeze-up of the extruder with crosslinked material. This temperature is the point where catastrophic uncontrolled crosslinking begins to occur. If unchecked, this will result in the formation of an intractable product incapable of being uniformly flowed onto a wire or cable and ultimately can freeze-up the extruder. With some control materials, the heat build up was so rapid that considerable scorching could not be avoided. Between each extrusion run, the extruder was purged with uncompounded resin until the initial operating conditions were again reached.

EXAMPLE I

To demonstrate the improved compositions of the present invention formulated with low levels of hydrocarbon processing oils, a flame retardant crosslinkable wire and cable product designed for 125° C. or 135° C. continuous service was prepared using an ethylene-vinyl acetate resin. The EVA copolymer contained 18% vinyl acetate (VA) and had a melt index (MI) of 2.4. The hydrocarbon processing oil used was a commercially available medium viscosity naphthenic oil (Sunthene ® 450; 56.8% saturates; 43.2% total aromatics; 100° F. viscosity 502 SUS). Details of the formulation were as follows:

|  | PARTS |
|---|---|
| EVA Copolymer | 100 |
| Hydrated Alumina | 125 |
| Vinyltrimethoxysilane | 1.5 |
| Tetrakis(methylene(3,5-di-t-butyl-4-hydroxyhydrocinnamate)) methane | 2.0 |
| Distearyl-3,3'-thiodipropionate | 1.0 |
| Alpha, alpha'-bis(t-butylperoxy) diisopropyl benzene | 1.7 |
| Lauric acid | 0.25 |
| Ethylene-bis-stearamide | 0.75 |
| Naphthenic Processing oil | 3.0 |

The formulation was readily processable and there were no problems with premature crosslinking upon extrusion. Smooth and uniform extrudates were produced at acceptable extrusion rates. The cured product had good physical and electrical properties as evidenced by the following results:

|  |  |
|---|---|
| Cure Level (%) | 90.1 |
| Dielectric Constant (1000 Hz) | 3.82 |
| Dissipation Factor (1000 Hz) | 0.0119 |
| Tensile Strength (psi) | 2730 |
| Elongation (%) | 270 |

In addition to having acceptable initial tensile and elongation values, the composition exhibited superior resistance to thermal deterioration upon heat aging. After heat aging at 163° C. for 18 days, the tensile strength and elongation were 2720 psi and 230%, respectively—both well above the limits of acceptability for resins designed for wire and cable coatings within this service range. While there was a small decrease in elongation with aging, 85.2% of the original elongation was retained which is considered to be more than adequate.

To illustrate the superior results obtained by the addition of the naphthenic processing oil, a formulation identical to that set forth above was prepared except that the hydrocarbon processing oil was omitted. While the product had acceptable electrical properties and the initial physical properties (3000 psi tensile, 200% elongation), upon heat aging at 163° C. for 18 days the elongation dropped to 160% which is below recommended industry standard for wire and cable formulations of this type.

Processability of the formulation of the invention was evaluated in accordance with the previously described procedure using a Brabender extruder and compared with the formulation which did not contain the processing oil. The head pressure developed with the formulation of the invention was 3975 psi whereas the comparative resin without the oil developed a head pressure of 4600 psi. Furthermore, after 6 minutes operation at a screw speed of 100 rpm the temperature in zone 2 of the extruder had already increased 40° F. with the comparative resin whereas only a 14° F. increase in temperature was observed with the formulation of the invention under identical processing conditions. This ability to reduce the amount of temperature increase in the compression zone of the extruder is an indication of improved resistance to undesirable premature cure, i.e., scorching.

EXAMPLES II AND III

To demonstrate the ability to utilize other hydrocarbon processing oils two compositions were prepared using the formulation of Example I. For the first composition (Product II), the hydrocarbon processing oil used was Sunpar ® 2280 paraffinic oil having a 100° F. viscosity of 2540 SUS and containing 74.7% saturates and 25.3% total aromatics. The processing oil used for the second composition (Product III) was Sunthene ® 4240—a naphthenic oil having a 100° F. viscosity of 2300 SUS and containing 53.3% saturates and 46.7% total aromatics. Both compositions exhibited good processability and the resulting crosslinked product had acceptable electrical and physical properties. The formulations and their properties are identified in the table which follows.

|  | PARTS | |
|---|---|---|
|  | PRODUCT II | PRODUCT III |
| EVA Copolymer | 100 | 100 |

-continued

|  | PARTS | |
|---|---|---|
|  | PRO-DUCT II | PRO-DUCT III |
| Hydrated Alumina | 125 | 125 |
| Vinyltrimethoxysilane | 1.5 | 1.5 |
| Tetrakis(methylene(3,5-di-t-butyl-4-hydroxyhydrocinnamate))methane | 2.0 | 2.0 |
| Distearyl-3,3'-thiodipropionate | 1.0 | 1.0 |
| Alpha, alpha'-bis(t-butylperoxy) diisopropyl benzene | 1.7 | 1.7 |
| Lauric acid | 0.25 | 0.25 |
| Ethylene-bis-stearamide | 0.75 | 0.75 |
| Processing oil | 3.0 | 3.0 |
| Cure Level (%) | 92.1 | 87.7 |
| Dielectric Constant (1000 Hz) | 3.77 | 3.78 |
| Dissipation Factor (1000 Hz) | 0.0107 | 0.0109 |
| Physical Properties: | | |
| Tensile Strength (psi) | 2720 | 2810 |
| Elongation (%) | 280 | 290 |
| Physical Properties after heat aging[1]: | | |
| Tensile Strength (psi) | 2610 | 2720 |
| Elongation (%) | 230 | 230 |

[1] 18 Days at 163° C.

EXAMPLES IV AND V

The ability to utilize hydrocarbon processing oils as the sole processing additive or with other conventional processing aids is demonstrated by the following examples. Formulations were prepared as follows:

|  | PARTS | |
|---|---|---|
|  | PRO-DUCT IV | PRO-DUCT V |
| EVA Copolymer of Example I | 100 | 100 |
| Hydrated Alumina | 125 | 125 |
| Vinyltrimethoxysilane | 1.5 | 1.5 |
| Tetrakis(methylene(3,5-di-t-butyl-4-hydroxyhydrocinnamate))methane | 1 | 1 |
| Bis Alkyl Sulfide (Anoxsyn ™ 442) | 2 | 2 |
| Alpha, alpha'-bis(t-butylperoxy) diisopropyl benzene | 1.7 | 1.7 |
| Ethylene-bis-stearamide | — | 0.75 |
| Processing oil of Example I | 3.0 | 3.0 |

Both compositions exhibited good processability and physical properties—initially and after aging at 158° C. for 14 days. Tensile and elongation values obtained were as follows:

|  | PRODUCT IV | PRODUCT V |
|---|---|---|
| Physical Properties (Initial): | | |
| Tensile Strength (psi) | 2900 | 2860 |
| Elongation (%) | 260 | 260 |
| Physical Properties after heat aging | | |
| Tensile Strength (psi) | 2950 | 2850 |
| Elongation (%) | 210 | 220 |

A comparable formulation which contained no hydrocarbon processing oil and 1 phr of a conventional processing additive package (a mixture of ethylene-bis-stearamide and lauric acid at a weight ratio of 3:1) had an initial tensile of 3010 psi and elongation of 240%. However, after being heat aged for 14 days at 158° C. significant deterioration (embrittlement) of the product was noted as evidenced by a 37.5% reduction in the elongation.

EXAMPLES VI AND VII

Utilizing the hydrocarbon processing oils of Examples II and III, formulations were prepared using a mixed resin comprised of an ethylene-vinyl acetate copolymer and ethylene-n-butylacrylate copolymer. The latter copolymer had a melt index of 0.3 and contained 19% n-butylacrylate. The formulations were as follows:

|  | PARTS | |
|---|---|---|
|  | PRO-DUCT VI | PRO-DUCT VII |
| EVA Copolymer of Example I | 80 | 80 |
| EBA Copolymer | 20 | 20 |
| Hydrated Alumina | 125 | 125 |
| Vinyltrimethoxysilane | 1.5 | 1.5 |
| Tetrakis(methylene(3,5-di-t-butyl-4-hydroxyhydrocinnamate))methane | 2.0 | 2.0 |
| Distearyl-3,3'-thiodipropionate | 1.0 | 1.0 |
| Alpha, alpha'-bis(t-butylperoxy) diisopropyl benzene | 1.7 | 1.7 |
| Lauric acid | 0.25 | 0.25 |
| Ethylene-bis-stearamide | 0.75 | 0.75 |
| Processing oil of Example II | 3.0 | — |
| Processing oil of Example III | — | 3.0 |

The compositions were processed in the usual manner. After crosslinking, the products had good physical properties and exhibited a high degree of resistance to deterioration upon heat aging. Tensile and elongation values for the unaged and heat aged (18 days at 163° C.) products were as follows:

|  | PRODUCT VI | PRODUCT VI |
|---|---|---|
| Physical Properties (Initial): | | |
| Tensile Strength (psi) | 2650 | 2460 |
| Elongation (%) | 260 | 250 |
| Physical Properties after heat aging | | |
| Tensile Strength (psi) | 2480 | 2620 |
| Elongation (%) | 220 | 240 |

The tensile of Product VI was significantly higher than the initial tensile value. Such increases in tensile strength are not uncommon and are believed to be the result of additional curing during the heat aging.

EXAMPLES VIII, IX, and X

A series of compositions were prepared in accordance with the invention and evaluated in high speed extrusion processing equipment. The compositions had the following recipes:

|  | PARTS | | |
|---|---|---|---|
|  | EX. VIII | EX. IX | EX. X |
| EVA Copolymer | 100 | 100 | 80 |
| EBA Copolymer | — | — | 20 |
| Hydrated Alumina | 125 | 125 | 125 |
| Vinylmethoxysilane | 1.5 | 1.5 | 1.5 |
| Tetrakis(methylene(3,5-di-t-butyl-4-hydroxyhydrocinnamate))methane | 1 | 1 | 1 |
| Bis Alkyl Sulfide (Anoxsyn ™ 442) | 2.0 | 2.0 | 2.0 |
| Alpha, alpha'-bis (t-butylperoxy) diisopropyl benzene | 1.7 | 1.7 | 1.7 |
| Lauric Acid | 0.25 | 0.25 | 0.25 |
| Ethylene-bis-stearamide | 0.75 | 0.75 | 0.75 |
| Naphthenic processing oil | 3.0 | 5.0 | 3.0 |

-continued

| | PARTS | | |
|---|---|---|---|
| | EX. VIII | EX. IX | EX. X |
| (Sunthene ® 450) | | | |

The processability of each of the above formulations was evaluated using a Brabender extruder. Head pressure and torque were measured for each and the time (in minutes) required for the temperature in zone 2 (compression zone) to reach 290° F. was also recorded. This is a indication of the length of time the composition can be processed under operating conditions before crosslinking begins to occur. The problems associated with premature crosslinking in the extruder have previously been discussed. Additionally, visual inspection of the extrudate was made and the time of the first appearance of roughness or unevenness on the extrudate recorded as the time to scorch. Each formulation was cured in accordance with the usual procedure and evaluated for resistance to heat aging. Results were as follows:

| Product No. | VIII | IX | X |
|---|---|---|---|
| Extrusion Data: | | | |
| Torque | 4200 | 4200 | 4400 |
| Head Pressure (psi) | 6400 | 6150 | 6450 |
| Head Pressure Stability | Stable | Stable | Stable |
| Time for Temperature in Zone 2 to reach 290° F. (minutes) | 12 | 14 | 13 |
| Time to Scorch (minutes)[1] | 15+ | 15+ | 15+ |
| Cure Level (%) | 86.6 | 83.3 | 86.2 |
| Physical Properties (Unaged): | | | |
| Tensile (psi) | 2810 | 2670 | 2630 |
| Elongation (%) | 240 | 270 | 240 |
| Physical Properties (Heat-aged[2]): | | | |
| Tensile (psi) | 2860 | 2830 | 2790 |
| % Retention of Unaged Tensile | 101.8 | 106.0 | 106.1 |
| Elongation (%) | 220 | 250 | 240 |
| % Retention of Unaged Elongation | 91.7 | 92.6 | 100 |

[1] Reported times which are followed by a + sign indicate the extrusion was terminated before there was any visual scorching of the extrudate.
[2] 18 days at 163° C.

It is apparent from the above data that all of the compositions were readily processable and that scorch times were within very operable limits. Furthermore, the compositions exhibited little or no deterioration under the heat aging conditions employed. To emphasize the superior results obtained, a formulation was prepared identical to products VIII and IX in all respects except that the processing oil was omitted. The head pressure during processing of this comparative formulation was erratic and varied between 6200 and 10000 psi. Furthermore, the temperature in the compression zone of the extruder (zone 2) rose to 290° F. in less than 6 minutes and visual scorching of the extrudate was observed after only 7 minutes operation.

EXAMPLE XI AND XII

Wire and cable insulation compositions designed for 150° C. continuous service were formulated in accordance with the following recipes:

| | Parts | |
|---|---|---|
| | EX. XI | EX. XII |
| EVA Copolymer | — | 80 |

-continued

| | Parts | |
|---|---|---|
| | EX. XI | EX. XII |
| (18 VA; MI 2.4) | | |
| EBA Copolymer | 100 | 20 |
| (19% nBA; MI 0.3) | | |
| Hydrated Alumina | 125 | 125 |
| Vinyl alkoxysilane | 1.5 | 1.5 |
| High Temperature Stabilizer Package (Antioxidant) | 5.6 | 5.6 |
| Organic Peroxide | 1.7 | 1.7 |
| Lauric Acid | 0.25 | 0.25 |
| Ethylene-bis-stearamide | 0.75 | 0.75 |
| Naphthenic Processing Oil (Sunthene ® 450) | 3.0 | 3.0 |

The above compositions were cured in accordance with the usual procedure and initial tensile and elongation properties were determined. Samples of the product were then aged at 165° C. and 180° C. Physical properties before and after heat aging were as follows:

| | EX. XI | EX. XII |
|---|---|---|
| Initial Tensile Strength (psi) | 1840 | 2140 |
| Initial Elongation (%) | 310 | 290 |
| After aging 7 days at 180° C.: | | |
| Tensile Strength (psi) | 1900 | 2220 |
| Elongation (%) | 260 | 230 |
| After aging 14 days at 180° C.: | | |
| Tensile Strength (psi) | 2080 | 2480 |
| Elongation (%) | 260 | 210 |
| After aging 30 days at 165° C.: | | |
| Tensile Strength (psi) | 2040 | 2380 |
| Elongation (%) | 240 | 200 |
| After aging 60 days at 165° C.: | | |
| Tensile Strength (psi) | 2200 | 2650 |
| Elongation (%) | 220 | 170 |

We claim:
1. A flame retardant crosslinkable polymeric composition comprising:
   (a) a polymer selected from the group consisting of copolymers of ethylene and vinyl esters of $C_{2-6}$ aliphatic carboxylic acids, copolymers of ethylene and $C_{1-6}$ alkyl acrylates, copolymers of ethylene and $C_{1-6}$ alkyl methacrylates, or mixtures thereof;
   (b) 80 to 400 phr hydrated inorganic filler;
   (c) 0.5 to 5 phr of a lower alkyl-, alkenyl-, alkynyl- or aryl-alkoxysilane having from 1 to 3 $C_{1-6}$ alkoxy substituents;
   (d) 0.5 to 8 phr antioxidant;
   (e) 0.25 to 6 phr naphthenic or paraffinic processing oil having a 100° F. viscosity from 100 SUS to 2500 SUS and saturates content from 50 to 90 percent with total aromatics content not exceeding 50 percent; and
   (f) 0.25 to 5 phr of a processing additive selected from the group consisting of a fatty acid, a calcium soap of a fatty acid, an aluminum soap of a fatty acid, a fatty acid amide, a mixture of a fatty acid and a fatty acid amide, a natural or synthetic wax and low molecular weight polyethylene.
2. The flame retardant crosslinkable polymeric composition of claim 1 wherein the polymer (a) is ethylene-vinyl acetate copolymer, ethylene-butyl acrylate copolymer, or mixtures thereof; (b) is a hydrated aluminum oxide, hydrated magnesia, hydrated calcium silicate, or hydrated magnesium carbonate; and (d) is a thio compound, a hindered phenol, polymerized 1,2-dihy- dro-2,2,4-trimethyl quinoline, tris(3,5-di-t-butyl-4-hydroxy benzyl)isocyanurate or mixtures thereof.

3. The flame retardant crosslinkable polymeric composition of claim 2 additionally containing from 1 to 8 phr of a chemical crosslinking agent.

4. The flame retardant crosslinkable polymeric composition of claim 3 wherein the chemical crosslinking agent is an organic peroxide, the alkoxysilane (c) is a vinyl alkoxysilane.

5. The flame retardant crosslinkable polymeric composition of claim 4 containing 80 to 200 phr (b), 0.75 to 4 phr (c), 1 to 6 phr (d), 0.5 to 4 phr (e) and 1.5 to 5 phr organic peroxide.

6. The flame retardant crosslinkable polymeric composition of claim 5 wherein the polymer (a) is an ethylene-vinyl acetate copolymer having from 9% to 30% vinyl acetate polymerized and a melt index from 0.5 to 5 or a mixture of polymers wherein said ethylene-vinyl acetate copolymer is the major component.

7. The flame retardant crosslinkable polymeric composition of claim 5 wherein the hydrated inorganic filler (b) is hydrated alumina.

8. The flame retardant crosslinkable polymeric composition of claim 5 wherein the alkoxysilane (c) is vinyltrimethoxysilane.

9. The flame retardant crosslinkable polymeric composition of claim 5 wherein the antioxidant (d) is a mixture of distearyl-3,3'- thiodipropionate and tetrakis(methylene (3,5-di-t-butyl-4-hydroxyhydrocinnamate)) methane.

10. The flame retardant crosslinkable polymeric composition of claim 5 wherein the antioxidant (d) is a mixture of a bis alkyl sulfide and tetrakis(methylene (3,5-di-t-butyl-4-hydroxyhydrocinnamate)) methane.

11. The flame retardant crosslinkable polymeric composition of claim 5 wherein the organic peroxide is dicumyl peroxide.

12. The flame retardant crosslinkable polymeric composition of claim 5 wherein the organic peroxide is alpha, alpha'-bis(t-butylperoxy) diisopropylbenzene.

13. The flame retardant crosslinkable polymeric composition of claim 5 wherein the processing additive (f) is a mixture of ethylene-bis-stearamide and lauric acid.

14. The flame retardant crosslinkable polymeric composition of claim 5 wherein the naphthenic or paraffinic processing oil (e) has a 100° F. viscosity from 200 SUS to 1200 SUS and the total aromatics content is from 10 to 45 percent.

15. The flame retardant crosslinkable polymeric composition of claim 14 wherein the olefin-vinyl ester copolymer is an ethylene-vinyl acetate copolymer containing 12 to 32 percent vinyl acetate, an ethylene-butyl acrylate copolymer containing 15 to 30 percent butyl acrylate, or mixtures thereof.

16. An electrical conductor coated with an insulating layer comprising the flame retardant crosslinkable polymeric composition of claim 1, 2, 3, 4, 5, 6, 7, 8, 9, 10, 11, 12, 13, 14, or 15.

17. In a flame retardant crosslinkable polymeric composition comprising a polymer selected from the group consisting of copolymers of ethylene and vinyl esters of $C_{2-6}$ aliphatic carboxylic acids, copolymers of ethylene and $C_{1-6}$ alkyl acrylates, copolymers of ethylene and $C_{1-6}$ alkyl methacrylates, or mixtures thereof, 80 to 400 phr hydrated inorganic filler, 0.5 to 5 phr alkoxysilane and 0.5 to 8 phr antioxidant, to effectively increase the processability and scorch resistance of the composition during processing and, after cure, to increase the heat stability of the composition, the improvement which comprises admixing with said composition a naphthenic or paraffinic processing oil having a 100° F. viscosity from 100 SUS to 2500 SUS, a saturates content from 50 to 90 percent, and total aromatics content not exceeding 50 percent and a processing additive selected from the group consisting of a fatty acid, a calcium soap of a fatty acid, an aluminum soap of a fatty acid, a fatty acid amide, a mixture of a fatty acid and a fatty acid amide, a natural or synthetic wax and low molecular weight polyethylene, the total amount of process additives comprising from 1 to 6 phr.

18. The improvement according to claim 17 wherein the copolymer is an ethylene-vinyl acetate copolymer having from 9% to 30% vinyl acetate polymerized and a melt index from 0.5 to 5, an ethylene-butyl acrylate copolymer having from 10% to 45% butyl acrylate polymerized and a melt index from 0.1 to 3, or mixtures thereof.

19. The improvement according to claim 18 wherein the hydrated inorganic filler is hydrated alumina and 1 to 8 phr organic peroxide crosslinking agent is included in the composition.

20. The improvement according to claim 19 wherein the naphthenic or paraffinic processing oil has a 100° F. viscosity from 200 SUS to 1200 SUS and total aromatics content in the range 10 to 45 percent.

21. The improvement according to claim 20 wherein the antioxidant is a mixture of tetrakis (methylene (3,5-di-t-butyl-4-hydroxyhydrocinnamate)) methane with distearyl-3,3'-thiodipropionate or a bis alkyl sulfide.

22. The improvement according to claim 21 wherein the alkoxysilane is vinyltrimethoxysilane.

23. The improvement according to claim 22 wherein the naphthenic or paraffinic processing oil is present in conjunction with ethylene-bis-stearamide and lauric acid.

24. The improvement according to claim 23 wherein the olefin-vinyl ester copolymer is an ethylene-vinyl acetate copolymer containing 12 to 32 percent vinyl acetate.

* * * * *